(12) United States Patent
McDonnell et al.

(10) Patent No.: US 7,822,891 B2
(45) Date of Patent: Oct. 26, 2010

(54) SYSTEM AND METHOD FOR TRANSFERRING A MULTIDIMENSIONAL ARRAY OF DATA TO A NON-CONTIGUOUS BUFFER

(75) Inventors: Glen T. McDonnell, Holland, PA (US); Martin E. Perrigo, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 286 days.

(21) Appl. No.: 11/451,322

(22) Filed: Jun. 13, 2006

(65) Prior Publication Data

US 2008/0005499 A1 Jan. 3, 2008

(51) Int. Cl.
*G06F 3/00* (2006.01)
*G06F 12/02* (2006.01)

(52) U.S. Cl. .............. 710/56; 710/52; 710/57; 345/543; 345/545; 345/547; 345/564; 345/569; 711/100; 711/154

(58) Field of Classification Search .............. 710/56
See application file for complete search history.

(56) References Cited

U.S. PATENT DOCUMENTS

| | | | | |
|---|---|---|---|---|
| 5,247,632 A | * | 9/1993 | Newman | 711/1 |
| 5,379,412 A | * | 1/1995 | Eastridge et al. | 711/162 |
| 5,500,939 A | * | 3/1996 | Kurihara | 345/537 |
| 5,546,532 A | * | 8/1996 | Trevett | 345/556 |
| 5,548,751 A | * | 8/1996 | Ryu et al. | 707/102 |
| 5,594,868 A | * | 1/1997 | Nakagoshi et al. | 709/234 |
| 5,841,988 A | * | 11/1998 | Chennubhotla et al. | 709/237 |
| 5,848,416 A | * | 12/1998 | Tikkanen | 707/101 |
| 6,006,289 A | * | 12/1999 | James et al. | 710/35 |
| 6,088,047 A | * | 7/2000 | Bose et al. | 345/547 |
| 6,349,364 B1 | * | 2/2002 | Kai et al. | 711/133 |
| 6,367,036 B1 | * | 4/2002 | Hansen | 714/45 |
| 6,496,591 B1 | * | 12/2002 | Rhoads | 382/100 |
| 6,636,223 B1 | * | 10/2003 | Morein | 345/581 |
| 6,697,889 B2 | * | 2/2004 | Kobara et al. | 710/57 |

(Continued)

FOREIGN PATENT DOCUMENTS

JP 2002094511 A * 3/2002

(Continued)

OTHER PUBLICATIONS

'Huge Z180 Arrays' by the Ganssle Group from http://www.ganssle.com/article/ahugedat.htm, posted on Sep. 1, 2000.*

(Continued)

*Primary Examiner*—Henry W Tsai
*Assistant Examiner*—Steven G Snyder
(74) *Attorney, Agent, or Firm*—McAndrews, Held & Malloy, Ltd.

(57) ABSTRACT

A system and method for storing a multidimensional array of data, such as a two dimensional (2-D) array of video data, in a non-contiguous memory space. The system and method maps individually indexed elements of a multidimensional array of data from a source device into blocks of non-contiguous memory available in a destination memory system, even when the destination blocks are small and/or their size does not correlate in any way to the dimensions of a source buffer. In particular, the blocks of non-contiguous memory may be as small as a single element of the data indexed in the 2-D array.

24 Claims, 8 Drawing Sheets

U.S. PATENT DOCUMENTS

| | | | |
|---|---|---|---|
| 6,771,271 B2* | 8/2004 | Ning et al. | 345/537 |
| 6,900,812 B1* | 5/2005 | Morein | 345/540 |
| 6,904,474 B1* | 6/2005 | Robertson | 710/33 |
| 7,143,433 B1* | 11/2006 | Duan et al. | 725/115 |
| 7,148,915 B1* | 12/2006 | Satoh | 348/207.99 |
| 2002/0016883 A1* | 2/2002 | Musoll et al. | 711/100 |
| 2002/0112105 A1* | 8/2002 | Daniel et al. | 710/112 |
| 2002/0178340 A1* | 11/2002 | Collins et al. | 711/206 |
| 2003/0014588 A1* | 1/2003 | Hu et al. | 711/118 |
| 2003/0028590 A1* | 2/2003 | Gonzalez et al. | 709/203 |
| 2003/0132942 A1* | 7/2003 | Obata et al. | 345/537 |
| 2003/0156112 A1* | 8/2003 | Halmshaw | 345/424 |
| 2004/0088477 A1* | 5/2004 | Bullen et al. | 711/109 |
| 2004/0172503 A1* | 9/2004 | Merchant | 711/114 |
| 2005/0081101 A1* | 4/2005 | Love et al. | 714/29 |
| 2006/0031652 A1* | 2/2006 | Richter et al. | 711/165 |
| 2006/0039351 A1* | 2/2006 | Furuhashi et al. | 370/351 |
| 2007/0112794 A1* | 5/2007 | McRae | 707/100 |
| 2007/0192433 A1* | 8/2007 | Chandrasekaran | 709/216 |

FOREIGN PATENT DOCUMENTS

JP    2007026070 A  *  2/2007

OTHER PUBLICATIONS http://web.archive.org showing the postings of the above Ganssle Group article.*

* cited by examiner

| Destination Address | Block Size |
|---|---|
| DADDR 1 | BSIZE 1 |
| DADDR 2 | BSIZE 2 |
| DADDR 3 | BSIZE 3 |
| o<br>o<br>o | o<br>o<br>o |
| DADDR *n* | BSIZE *n* |

FIG. 4

SYSTEM AND METHOD FOR TRANSFERRING A MULTIDIMENSIONAL ARRAY OF DATA TO A NON-CONTIGUOUS BUFFER

BACKGROUND OF THE INVENTION

1. Field of the Invention

The invention is generally related to systems and methods for transferring data to memory. In particular, the present invention is related to systems and methods for transferring a multidimensional array of data to a non-contiguous buffer.

2. Background

Very often in computer systems it is necessary to transfer large multidimensional arrays of data, such as two-dimensional (2-D) arrays of raw video data, from a source device to a destination memory system. Certain conventional source devices will not transfer the source data to the destination memory system unless a requisite amount of contiguous memory space is available at the destination. For example, the ATI Theater™ 550 Pro (a product of ATI Technologies Inc. of Markham, Ontario) requires that a driver allocate a contiguous buffer in the destination memory space that is large enough to hold the contents of the entire source buffer. The driver must then copy the data into the sparse memory area for an application to use. This approach is rather inefficient as the data transfer is delayed if there is not a large enough contiguous block of destination memory space currently available to store the array.

The Rockwell Bt878/879 (a product of Rockwell Semiconductor Systems of Newport Beach, Calif.) transfers video data over a PCI bus to a personal computer (PC) system. The Rockwell Bt878/879 does not require a complete contiguous destination buffer, but it does require that each line of video data be transferred to a linear, contiguous, area of memory. This essentially changes the problem to transferring data into a series of one-dimensional buffers. For long, high-definition scan lines, this may require larger contiguous blocks of memory than are currently available.

In some systems, the receiving system provides a table that identifies a series of blocks of available memory which may be scattered throughout the destination memory space. The source devices mentioned above cannot use any of these blocks of available memory unless they each exceed a predetermined amount of contiguous memory. In the case of the ATI Theater™ 550 Pro, a block must be large enough to hold the entire source buffer, whereas in the case of the Rockwell Bt878/879, a block must be large enough to hold at least one line of video data.

What is desired then is a system and method for transferring a multidimensional array of data, such as a 2-D array of video data, from a source device to a destination memory system that addresses the foregoing shortcomings of conventional solutions. In particular, the desired system and method should be able to map the elements of a large multidimensional array of data from a source device into blocks of contiguous memory available in a destination memory system, even when the destination blocks are small and/or their size does not correlate in any way to the dimensions of the source buffer. Additionally, the desired system and method should be able to gracefully handle situations where an arbitrary number of samples in the stream of data being transferred from the source device to the destination memory system are skipped. Such "jumps" in the data stream may occur if there is an overflow of the source buffer as a result of latency in a system where the data transfer takes place over a variable speed interface.

BRIEF SUMMARY OF THE INVENTION

The present invention provides an improved system and method for storing multidimensional arrays of data, such as a two dimensional (2-D) array of video data, in a non-contiguous buffer. In particular, a system and method in accordance with an embodiment of the present invention is able to map the elements of a large multidimensional array of data from a source device into blocks of contiguous memory available in a destination memory system, even when the destination blocks are small and/or their size does not correlate in any way to the dimensions of a source buffer. In particular, the blocks of contiguous memory may be as small as a single element of the data indexed in the 2-D array. Thus the present invention handles data transfers more efficiently than conventional implementations. Additionally, a system and method in accordance with an embodiment of the present invention gracefully handles situations where an arbitrary number of samples in the stream of data being transferred from the source device to the destination memory system are skipped. As a result, any degradation resulting from delivery of the data to an end user may be minimized.

A method in accordance with a particular embodiment of the present invention may be used for transferring a multidimensional array of data to a destination memory space. The method includes reading an element indexed in the multidimensional array. It is then determined whether a first block of memory within the destination memory space includes sufficient space to store the element. If the first block of memory includes sufficient space to store the element, then the element is stored in the first block of memory. Alternatively, if the first block of memory does not include sufficient space to store the element, the element is stored in a second block of memory. In a further embodiment, the element is stored within either the first or second block of memory at a location that is determined based on the indices at which the element is indexed within the multidimensional array.

A system in accordance with a particular embodiment of the present invention includes a source device, a source memory and a destination memory system. The source memory is accessible by the source device and stores a multidimensional array of data. The destination memory system is coupled to the source device and includes a destination memory space. The source device is configured to access the source memory and read an element indexed in the multidimensional array. The source device is further configured to determine if a first block of memory within the destination memory space includes sufficient space to store the element. The source device is still further configured to transfer the element to the destination memory system for storage in the first block of memory responsive to a determination that the first block of memory includes sufficient space to store the element and to transfer the element to the destination memory system for storage in a second block of memory responsive to a determination that the first block of memory does not include sufficient space to store the element.

In a further embodiment, the source device is configured to transfer the element to the destination memory system for storage at a location within either the first block of memory or that second block of memory that is determined based on the indices at which the element is indexed within the multidimensional array.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 4 illustrates an example of a table that identifies a series of blocks of available memory scattered throughout a destination memory space in accordance with an embodiment of the present invention.

Figure 1:
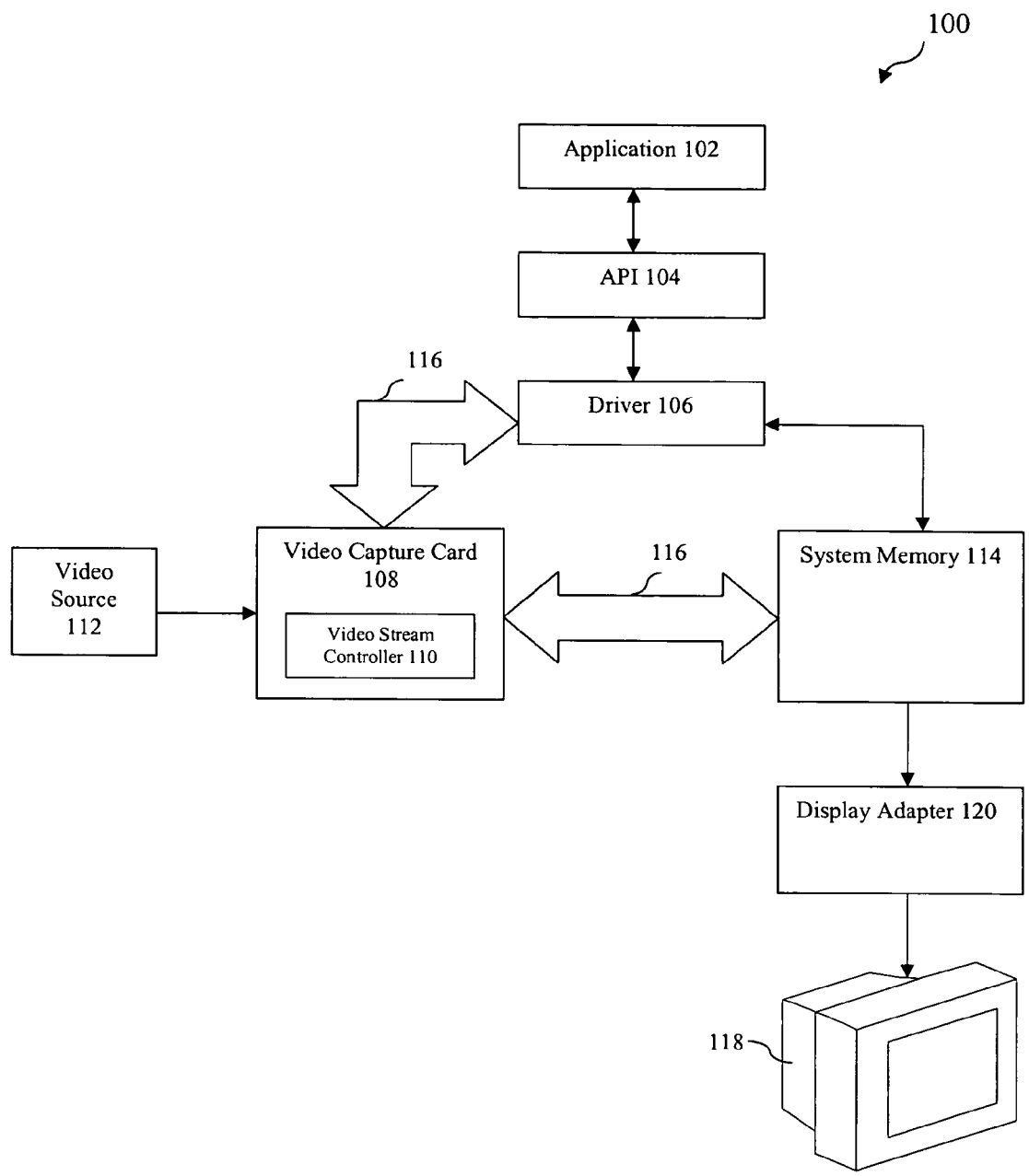
FIG. 1 is a block diagram of a video processing system in which an embodiment of the present invention may be implemented.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Example Operating Environment

FIG. 1 illustrates an example video processing system 100 in which an embodiment of the present invention may be implemented. As will be described in more detail herein, the present invention is not limited to video processing systems, but is generally applicable to any system in which a multi-dimensional array of data is transferred from a source to a destination memory for storage therein. Video processing systems in particular can benefit from the present invention because such systems are often required to transfer large two-dimensional (2-D) arrays of video data from a source device to a destination memory system.

As shown in FIG. 1, video processing system 100 includes various software elements, including an application 102, an application programming interface (API) 104, and a driver 106. These software elements are executed on a host computer system and interact with video hardware elements, such as a video stream controller 110, to obtain video content from an external video source 112 and transfer the video content to system memory 114. Video stream controller 110 resides on a video capture card 108 that is installed on the host computer system. The individual elements of system 100 will now be described in more detail.

Application 102 is a software program that permits an end user to obtain video content, such as digital video content, from an external video source 112 and to view the video content via display 118. Application 102 communicates with API 104 to perform these tasks. Several APIs are available for use in the video processing context. APIs were developed as intermediaries between application software, such as application 102, and video hardware on which the application software runs. APIs prevent applications from having to be too hardware-specific. The application can output commands to the API in a standardized format, rather than in a proprietary format dictated by the video hardware. DirectShow® is an example of an available API. API 104 can be any one of the available APIs for managing video content.

API 104 communicates with driver 106. Driver 106 is typically written by the manufacturer of the video hardware, and translates standard code received from API 104 into a native format understood by the video hardware.

The video hardware includes a video capture card 108 that is installed in a PCI or PCI-Express slot of the host computer. This enables the video capture card 108 to communicate over a PCI or PCI-Express bus 116 with other elements of video processing system 100, such as driver 106 and system memory 114. Video capture card 108 is adapted to receive video input from an external video source 112 and to transfer video data to system memory 114 for viewing by the end user. System memory 114 is intended to represent any memory within the memory map of the host system, including but not limited to main system memory or the frame buffer of a display adapter 120.

Figure 2:
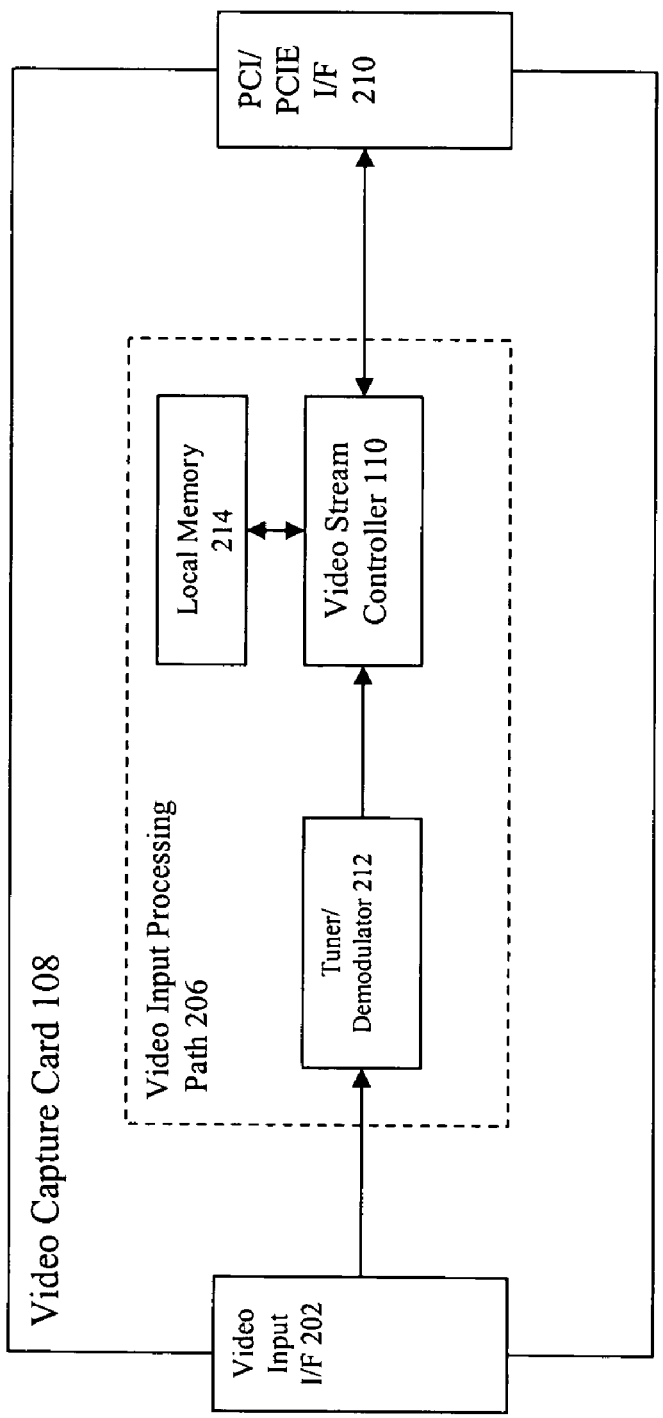
FIG. 2 is a block diagram of a video card that is part of the video processing system described in reference to FIG. 1.

FIG. 2 illustrates video capture card 108 in more detail. Video capture card 108 includes a video input interface 202, such as an antenna or cable television feed, by which video data is received from external video source 112. Video capture card 108 also includes a PCI or PCI-Express interface 210 by which data is transmitted and received over PCI/PCI-Express bus 116. Video capture card 108 further includes a video input processing path 206 that processes video data received via video input interface 202 and then provides such data to other elements of video processing system 100 via PCI/PCI-Express interface 210.

Video input processing path 206 includes a tuner/demodulator 212 and a video stream controller 110. Tuner/demodulator 212 extracts a stream of encoded video data received via video input interface 202 and provides it to video stream controller 110. Among other processing tasks, video stream controller 110 passes the video data to other elements of video processing system 100. Video stream controller 110 is coupled to a local memory 214 that is used by video stream controller 110 for storing video data and other data associated with performing its processing tasks. In an embodiment, video stream controller 110 is included in an application-specific integrated circuit (ASIC), although the invention is not so limited.

When an end user instructs application 102 to obtain video content from video source 112 for display on display 118, a call is placed to API 104 to perform these tasks. API 104 in turn communicates with driver 106, which sends appropriate commands to video stream controller 110. Responsive to such commands, video stream controller 110 begins sending frames of video data, which are stored as large 2-D arrays of data in local memory 214, to system memory 114, where they are accessible to driver 106 and API 104. From system memory, the frames of video data can then be sent for output to display 118.

The present invention is directed to a more efficient method of performing the aforementioned function of transferring large 2-D arrays of video data from local memory 214 to system memory 114. However, the present invention is not limited to the operating environment described with respect to FIGS. 1 and 2. Rather, persons skilled in the art will readily appreciate that the present invention is applicable to any system in which a multidimensional array of data is stored in a non-contiguous memory space.

Figure 3:
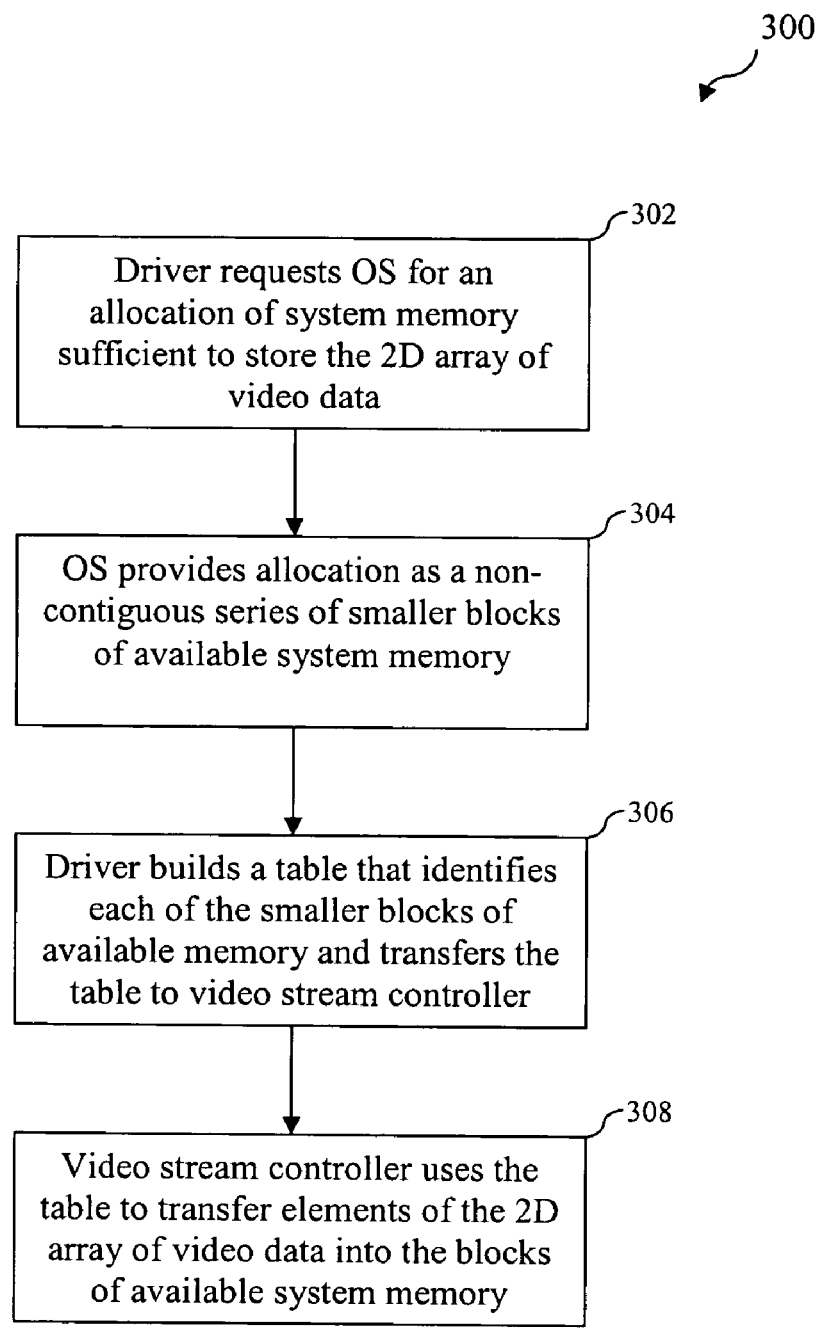
FIG. 3 is a flowchart of the steps that occur when transferring a field of video data from a local memory of a video capture device to a system memory.

B. Transfer of Multidimensional Array to a Non-Contiguous Memory Space in Accordance with an Embodiment of the Present Invention FIG. 3 is a flowchart 300 of the steps that occur when transferring a field of video data from local memory 214 of video stream controller 110 to system memory 114. As noted above, the field of video data is a large 2-D array of data. At step 302, driver 106 sends a request to the operating system for an allocation of system memory sufficient to store the 2-D array of video data. At step 304, the operating system returns an allocation of memory of the requested size. This allocation is typically fragmented into a non-contiguous series of smaller blocks of available memory that do not correlate in any way to the dimensions of the source buffer. At step 306, driver 106 builds a table that identifies in sequence the destination address and size of each of the blocks of available memory and transfers the table to video stream controller 110. At step 308, video stream controller 110 then uses the table to transfer elements of the 2D array of video data into the blocks of available system memory.

FIG. 4 illustrates an example of a table 400 built by driver 106 in step 306 of flowchart 300. As shown in FIG. 4, table 400 includes a column 402 that identifies the destination address of each block of available memory that makes up the allocation of memory provided by the operating system. These destination addresses are provided in a linear sequence and are denoted DADDR1 through DADDR n. Table 400 further includes a column 404 that provides the corresponding block size for each block identified by a destination address in column 402. These block sizes are denoted BSIZE1 through BSIZE n. Persons skilled in the art will readily appreciate that this illustration is provided for explanatory purposes only and that other logical structures and arrangements could be used to identify the blocks of available memory.

The manner in which video stream controller 110 uses the table to transfer elements of the 2-D array of video data into the non-contiguous blocks of available system memory will now be described with respect to FIGS. 5 and 6. Although these methods will be described with respect to the transfer of a 2-D array of video data from local memory 214 of video stream controller 110 to system memory 114 of video processing system 100, persons skilled in the art will readily appreciate that each of these methods are generally applicable to any system that transfers a multidimensional array of data from a source to a non-contiguous memory space.

Each of the methods described below with respect to FIGS. 5 and 6 differ from conventional methods in that they transfer data from the 2-D array on an element-by-element basis, rather than transferring the data on a line-by-line basis or the array as a whole. As used herein, the term "element" of an array refers to the smallest atomic units that are indexed within the array, whatever those units may be. For example, if the video data in the 2-D array is 4:2:2 coded video data, each element of the 2-D array could comprise a pair of pixels that are represented by two luminance samples and two chrominance samples. The number of bits or bytes that make up each element are determined by the precision of the data used to represent each element. Thus, if 8 bits were used to represent each of the two luminance and two chrominance samples, the size of each element would be 4 bytes. However, this example is not intended to be limiting, and persons skilled in the art will readily appreciate that elements of any type and size may be used in the 2-D array.

Figure 5:
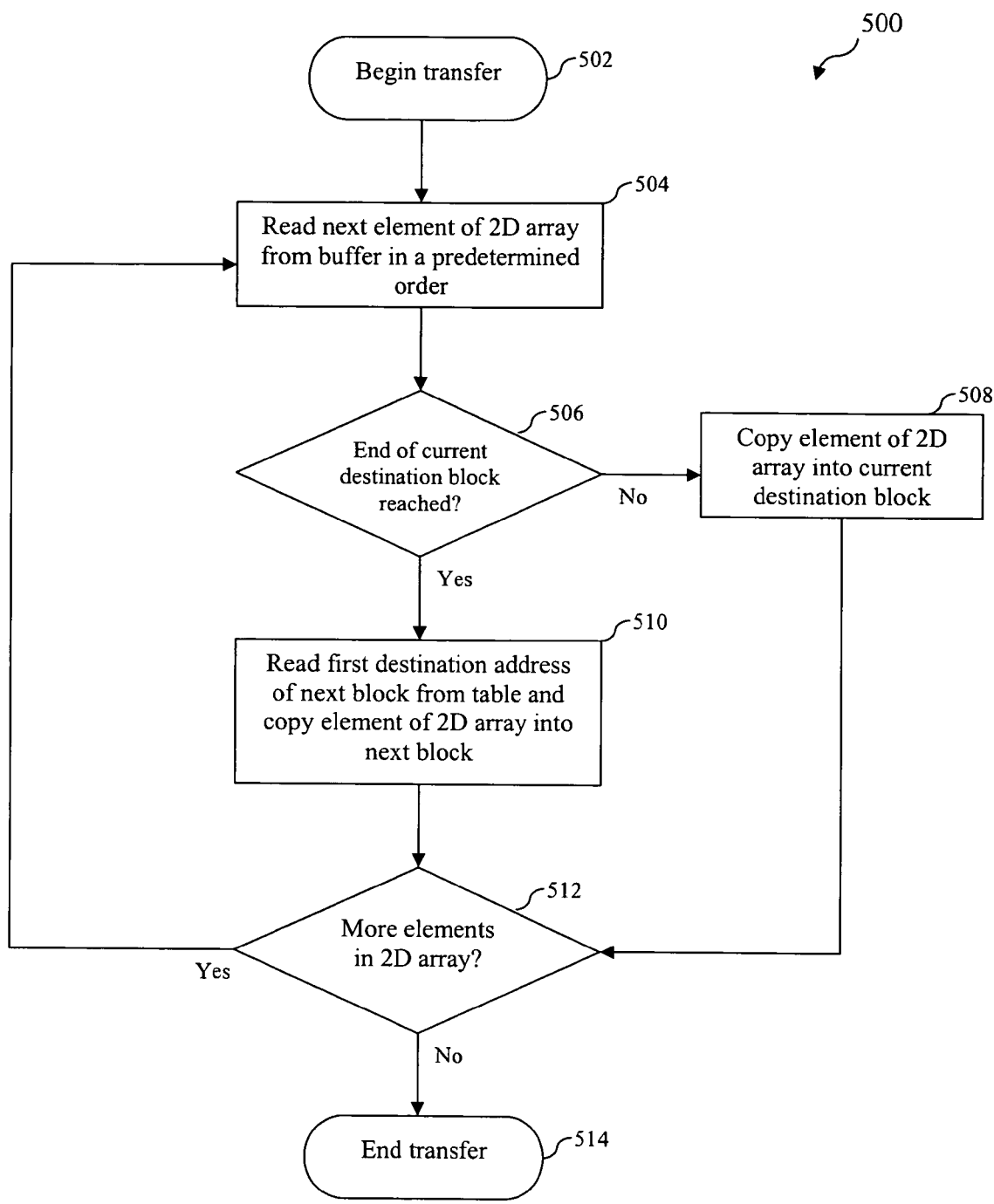
FIG. 5 is a flowchart of a first method by which the elements of a 2-D array are transferred into non-contiguous blocks of available memory in accordance with an embodiment of the present invention.
Figure 6:
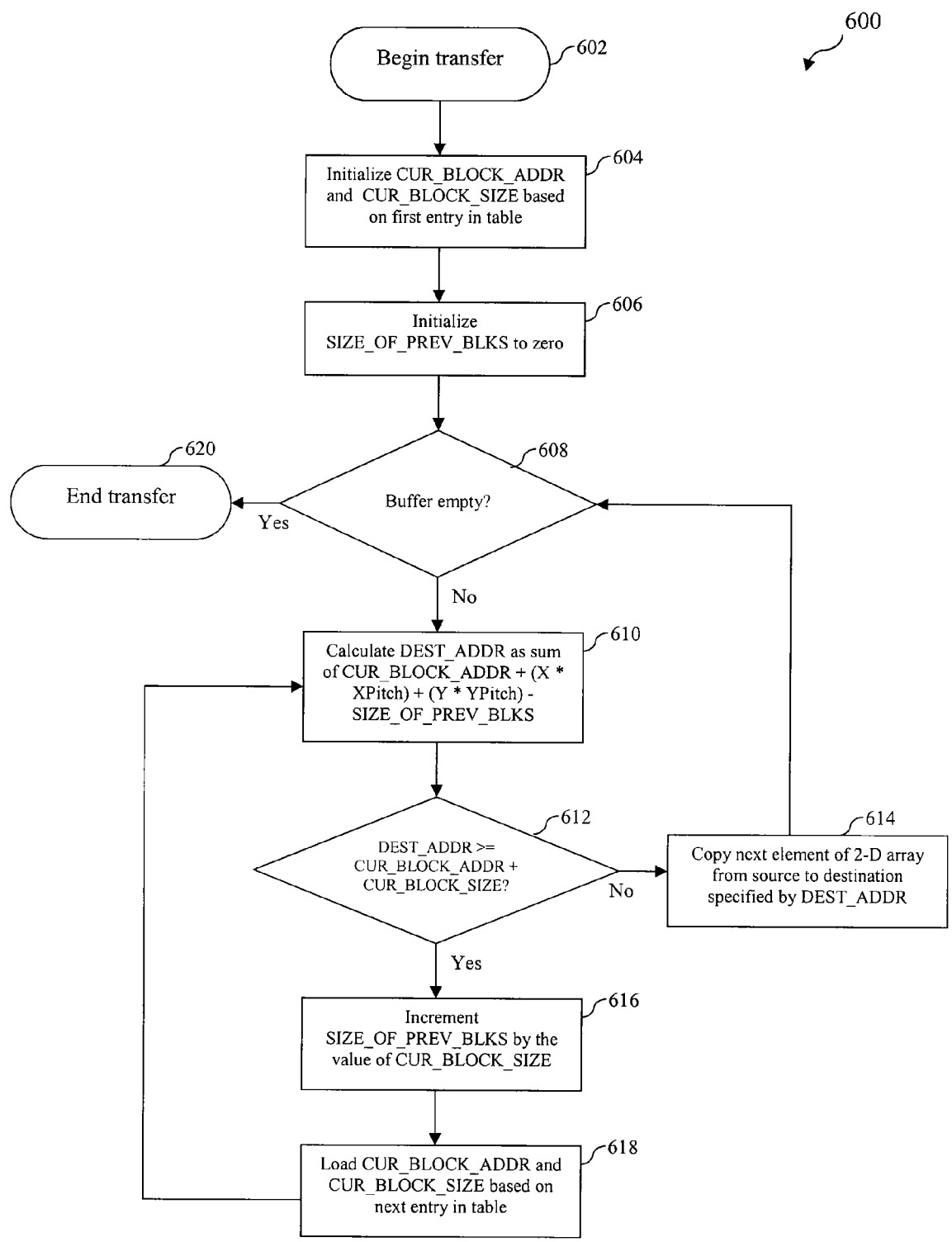
FIG. 6 is a flowchart of a second method by which the elements of a 2-D array are transferred into non-contiguous blocks of available memory in accordance with an embodiment of the present invention.

In an embodiment, video stream controller 110 implements the methods of FIG. 5 or FIG. 6 in dedicated hardware, although the invention is not so limited. Persons skilled in the relevant art will readily appreciate that these methods could also be implemented in software or as a combination of software and hardware.

FIG. 5 is a flowchart 500 of a first method by which video stream controller 110 uses the table from driver 106 to transfer elements of a 2D array of video data into non-contiguous blocks of available system memory. As shown in FIG. 5, the beginning of the data transfer process is indicated at step 502. At step 504, video stream controller 110 reads a next element of the 2-D array from a source buffer in local memory 214 in accordance with a predetermined order. For example, the predetermined order might be to sequentially read elements from rows proceeding from left to right in the array until reaching the end of the row, and then moving sequentially down to the next row.

At step 506, video stream controller 110 uses the table provided by driver 106 to identify a current block of available system memory and ascertains whether or not the end of the current block of available system memory has been reached. If the end of the current block has not been reached, video stream controller 110 transfers or copies the element of the 2-D array into the current block of available system memory as shown at step 508. If, however, the end of the current block has been reached, then video stream controller 110 uses the table provided by driver 106 to ascertain the destination address of the next block of available system memory and transfers or copies the element of the 2-D array into that block as shown at step 510. The next block then becomes the current block for the purposes of subsequent processing steps.

In either case, the method then proceeds to step 512, in which a determination is made whether or not there are more elements to be read from the 2-D array. If there are more elements, then control returns to step 504; otherwise, the data transfer ends as indicated at step 514.

As can be seen from the foregoing description of flowchart 500, one solution for transferring the 2-D array is for video stream controller 110 to sequence through the 2-D array in local memory 214 on an element-by-element basis and copy the elements into each destination address identified in the table. Whenever the end of one destination block is reached, video stream controller 110 reads the first destination address of the next block from the table and continues copying elements in order. This works well as long as there are no gaps in the source data. However, sometimes video stream controller 110 can encounter buffer overflows due to insufficient available buffer space in local memory 214. In that case it may be necessary to jump ahead in the data sequence. If the element-by-element sequencing approach described above with reference to FIG. 5 is being used, a complex calculation is required to determine the number of elements that have been skipped and then to skip that number of locations in the destination sequence.

A second approach in accordance with an embodiment of the present invention is to derive the destination address directly from the indices of the 2-D array. This has the benefit of eliminating the problem of a gap in the source data stream. For the sake of explanation, these indices will be referred to hereinafter as the X and Y indices of the 2-D array, although any nomenclature could be used.

At the beginning of the 2-D array, the destination address is simply the address of the first available block of system memory (as identified in the table provided by driver 106) plus an offset implied by the X and Y coordinates of the current data element. In other words:

$$DEST\_ADDR = BLOCK0\_ADDR + X*XPitch + Y*YPitch,$$

wherein DEST_ADDR is the destination address, BLOCK0_ADDR is the address of the first block of available system memory, X and Y are the X and Y coordinates respectively of the current data element, and XPitch and YPitch are the number of bytes between elements in each dimension of the 2-D array. In a 2-D video processing system, this would typically be the number of bytes per pixel and the number of bytes per line of video, respectively. However, any desired numbers may be used.

The foregoing simple computation works until the first block of available system memory is filled, or until a gap in the data sequence causes the computed address to be outside of the first block. At this point, video stream controller 110 must determine how to map the next element in the 2-D array, which may have an arbitrary X-Y value, into the destination memory space. As will be described in more detail below, in order to do this, video stream controller 110 keeps track of the cumulative total size of each block of available system memory and subtracts that from the X-Y offset to obtain the relative offset in the current block of data. This method assumes that the table provided by driver 106 provides an address for each available block of system memory as well as the size of the available block at that address. Furthermore, the method assumes that the size of each available block is a multiple of the size of the element that is being transferred.

An implementation of this method will now be fully described with reference to flowchart 600 of FIG. 6. In particular, FIG. 6 illustrates a flowchart 600 of a second method by which video stream controller 110 uses the table from driver 106 to transfer elements of a 2D array of video data into non-contiguous blocks of available system memory.

As shown in FIG. 6, the beginning of the data transfer process is indicated at step 602. At step 604, video stream controller 110 initializes variables CUR_BLOCK_ADDR and CUR_BLOCK_SIZE with values based on the first entry in the table provided by driver 106, wherein CUR_BLOCK_ADDR holds the address of the current block of available system memory and CUR_BLOCK_SIZE holds the size of the current block of available system memory. At step 606, video stream controller 110 sets the variable SIZE_OF_PREV_BLKS to zero, wherein SIZE_OF_PREV_BLKS holds a value indicating the cumulative size of all the previously populated blocks of available system memory.

At step 608, video stream controller 110 determines whether the buffer storing the elements of the 2-D array is empty. If the buffer is empty, then the data transfer is complete as indicated at step 620. If the buffer is not empty, then control passes to step 610.

At step 610, video stream controller 110 calculates the variable DEST_ADDR, which holds the destination address at which the next element in the 2-D array is to be stored. Video stream controller 110 calculates DEST_ADDR as the sum of CUR_BLOCK_ADDR plus (X*XPitch) plus (Y*YPitch) less SIZE_OF_PREV_BLKS. X denotes the X coordinate of the next element in the 2-D array and Y denotes the Y coordinate of the next element in the 2-D array. XPitch and YPitch are the number of bytes between elements in each dimension of the 2-D array. Thus, XPitch is equal to the size in bytes of each element in the 2-D array, while YPitch is equal to the number of bytes between the start of one line in and the start of the next line the 2-D array. This step effectively subtracts the cumulative size of all the previously populated blocks of available system memory from the X-Y offset to obtain the relative offset in the current block of available system memory.

At step 612, video stream controller 110 compares the value of DEST_ADDR to the sum of CUR_BLOCK_ADDR plus CUR_BLOCK_SIZE. If DEST_ADDR is not greater than or equal to the sum of CUR_BLOCK_ADDR+ CUR_BLOCK_SIZE, then the relative X-Y offset in the current block of available system memory does not extend beyond the end of the block. Accordingly, video stream controller 110 copies or transfers the next element of the 2-D array to the current block as shown at step 614, and control is then returned to step 608.

However, if DEST_ADDR is greater than or equal to the sum of CUR_BLOCK_ADDR+CUR_BLOCK_SIZE, then the relative X-Y offset in the current block of available system memory does extend beyond the end of the block. In other words, the current block is full. As a result, video stream controller 110 increments SIZE_OF_PREV_BLKS by the value of CUR_BLOCK_SIZE as shown at step 616 and loads CUR_BLOCK_ADDR and CUR_BLOCK_SIZE with new values based on the next sequential entry in the table provided by driver 106 as shown at step 618. Once these additional steps have occurred, processing then returns to step 610, in which video stream controller 110 recalculates DEST_ADDR based on the updated values of SIZE_OF_PREV_BLKS and CUR_BLOCK_ADDR. Assuming now that DEST_ADDR is not greater than or equal to the sum of CUR_BLOCK_ADDR+CUR_BLOCK_SIZE, then video stream controller 110 copies or transfers the next element of the 2-D array to the current block as shown at step 614, and control is then returned to step 606.

The following is a pseudo-code representation of the foregoing processing steps described in reference to FIG. 6:

```
(CUR_BLOCK_ADDR, CUR_BLOCK_SIZE) = First table entry
SIZE_OF_PREV_BLKS = 0;
while ( buffer not full ) {
    // X = source X coordinate, Y = source Y coordinate
    // XPitch = array element size (in bytes)
    // YPitch = # bytes between start of one line
    //         and start of next line of the 2-D array
    DEST_ADDR = CUR_BLOCK_ADDR + (X * XPitch) +
            (Y * YPitch) − SIZE_OF_PREV_BLKS;
    If (DEST_ADDR >= (CUR_BLOCK_ADDR +
      CUR_BLOCK_SIZE)) {
        // Current block full, load next table entry,
```

```
        // and compute new address before writing
        SIZE_OF_PREV_BLKS += CUR_BLOCK_SIZE;
        (CUR_BLOCK_ADDR, CUR_BLOCK_SIZE) = Next table entry
    }
    Else
    {
        // Copy data sample from source to destination
    }
}
```

Figure 7:
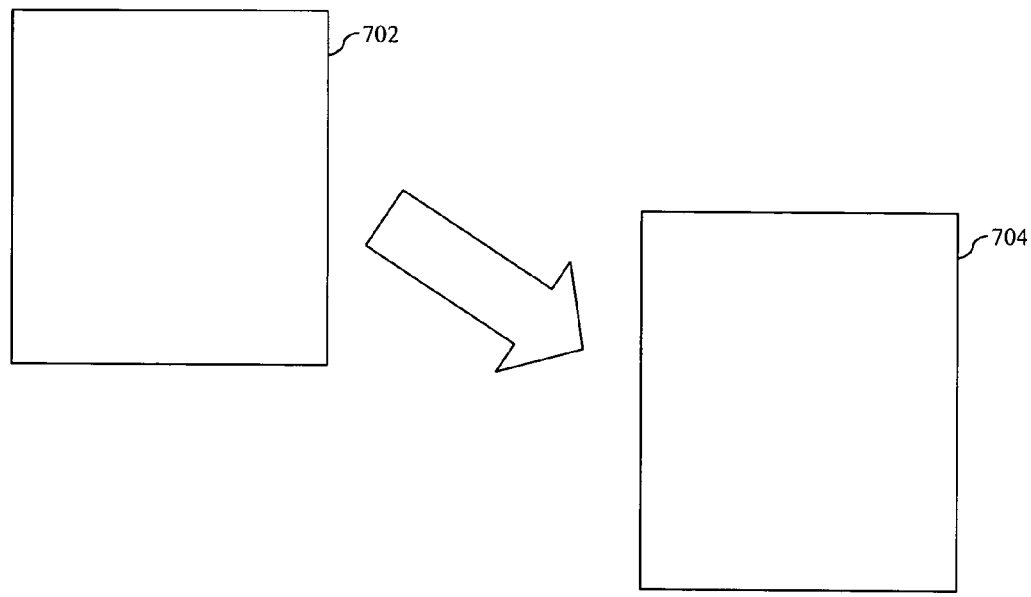
FIG. 7 illustrates the transfer of a multidimensional array of data from a source buffer to a single contiguous block of destination memory in accordance with an embodiment of the present invention.

The present invention is advantageous in that it facilitates the transfer of a multi-dimensional array from a source buffer to a destination buffer, regardless of whether the destination buffer is a block of contiguous memory or, alternatively, fragmented in some defined or arbitrary manner. In the simplest case, there is only a single contiguous destination block and all the source data must fit into the destination block. This case is depicted in FIG. 7, in which the source data is indicated as the large block 702 and the destination buffer is indicated as block 704. In a video processing application, it is possible that the destination may include overscan samples (i.e., the number of samples per line in the destination could be larger than the number of samples in the source per line), but the destination can never have a smaller number of samples per line than the source. In the case of overscan, the memory for the overscan is allocated, but not written to (since there is no source data) and there will be a "gap" in the destination data.

Figure 8:
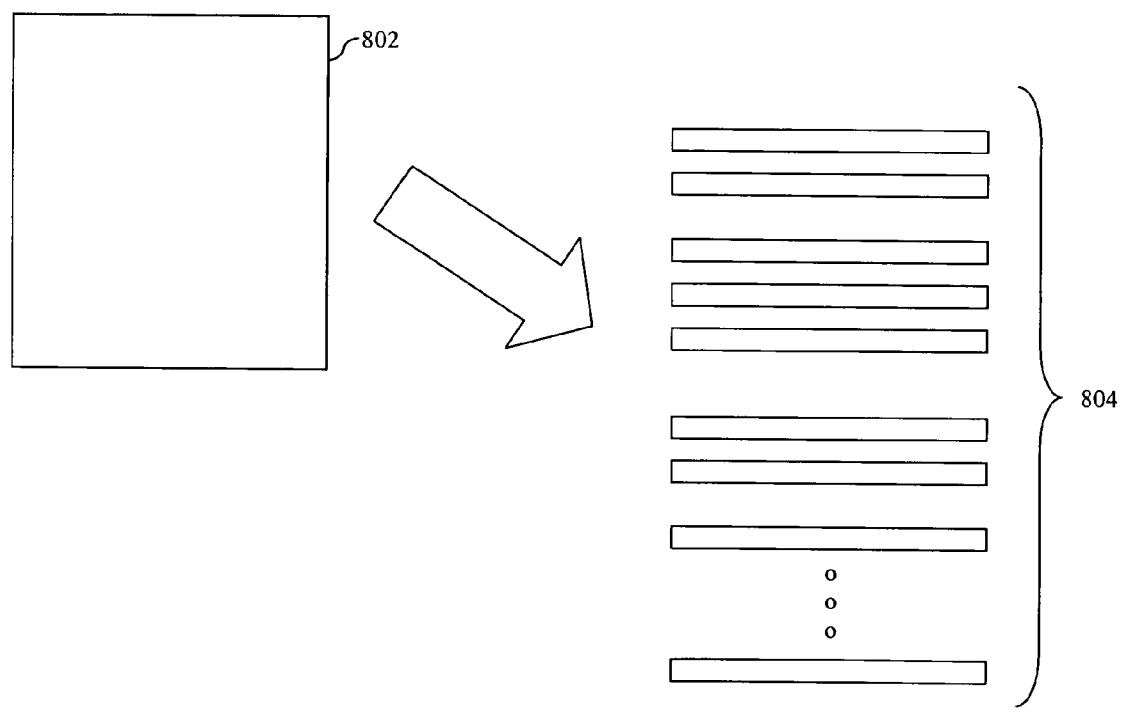
FIG. 8 illustrates the transfer of a multidimensional array of data from a source buffer to a series of equally-sized blocks of destination memory in accordance with an embodiment of the present invention.

In another example, the destination buffer may be comprised of multiple blocks, wherein each block is defined to hold a single scan line of the source array. This example is illustrated in FIG. 8, in which the source data is indicated as the large block 802 and the destination buffer is shown as comprising a series of equally-sized blocks 804.

Figure 9:
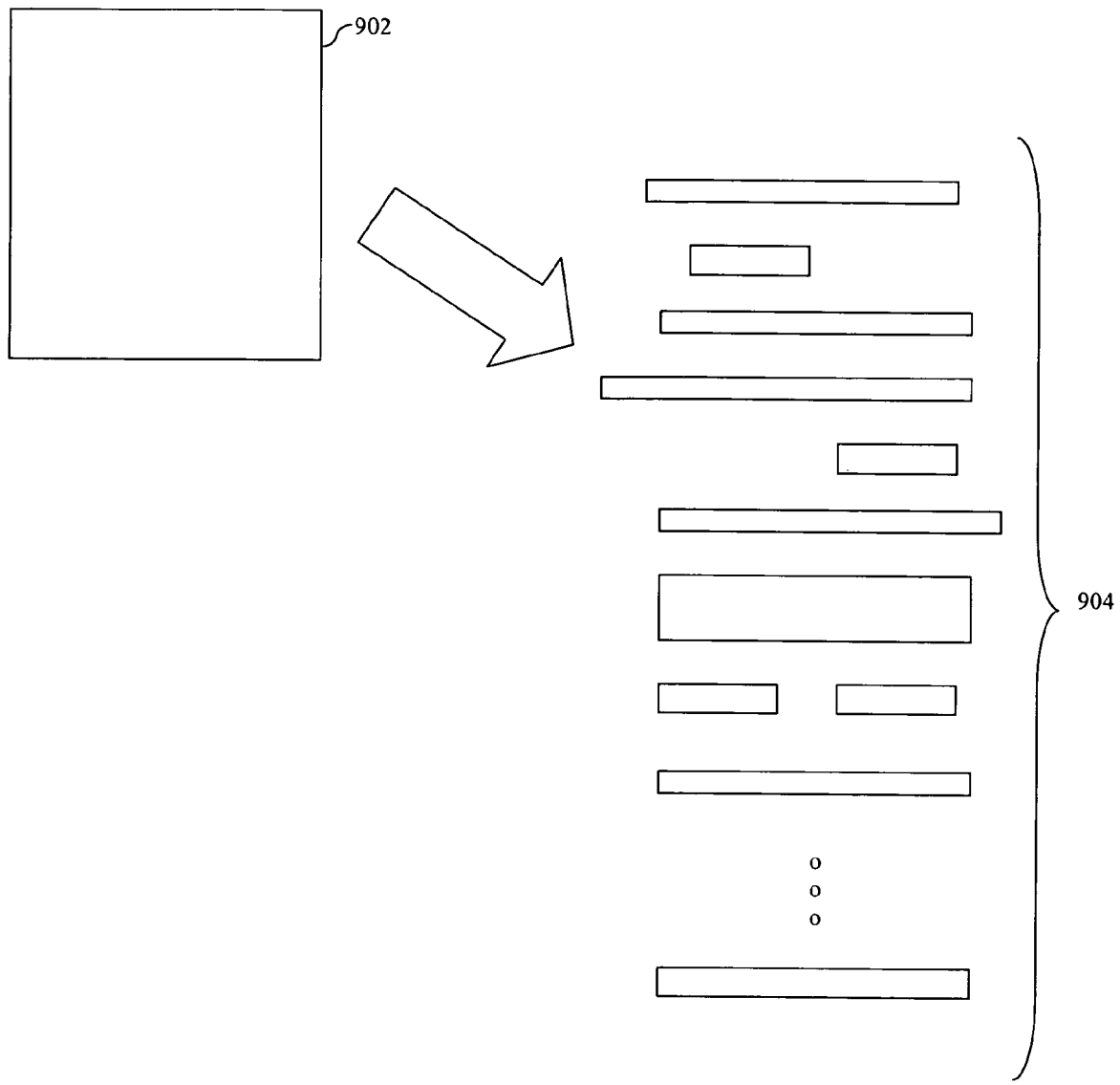
FIG. 9 illustrates the transfer of a multidimensional array of data from a source buffer to a highly fragmented series of blocks of destination memory, the blocks being of arbitrary size, in accordance with an embodiment of the present invention.

Many more complex cases can exist and are handled by the present invention. FIG. 9 illustrates an example in which the source data 902 must be transferred to a highly fragmented series of blocks of destination memory 904, wherein each block may be of an arbitrary size. The worst case scenario would be for each destination block to contain only a single source sample. It is unlikely that a case this severe would occur, but due to memory fragmentation, it is conceivable to have some blocks that are smaller than a line and other blocks that are multiple lines (possibly with overlap onto other lines).

C. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for transferring a multidimensional array of data to a destination memory space comprising:
    reading an element indexed in the multidimensional array;
    determining if a first block of memory within the destination memory space includes sufficient space to store the element such that the element can be stored in a first location in the first block determined based on indices at which the element is indexed within the multidimensional array;
    storing the element in the first location responsive to a determination that the first block of memory includes sufficient space to store the element; and
    storing the element in a second location in a second block of the destination memory responsive to a determination that the first block of memory does not include sufficient space to store the element, wherein the first and second blocks are non-contiguous memory blocks, and wherein the second location is determined based on a size of the first block, a destination address in the second block, and a block size of the second block.

2. The method of claim 1, wherein determining if the first block of memory includes sufficient space to store the element comprises calculating a destination address for storing the element and determining if the destination address is outside of the address space encompassed by the first block of memory.

3. The method of claim 1, wherein the multidimensional array of data is a two-dimensional (2-D) array, and wherein determining if the first block of memory includes sufficient space to store the element comprises calculating:
    DEST_ADDR=CUR_BLOCK_ADDR+(X*XPitch)+(Y*YPitch)−SIZE_OF_PREV_BLKS,
    wherein DEST_ADDR is a destination address for storing the element, CUR_BLOCK_ADDR is the address at which the first block of memory is located within the destination memory space, X and Y are first and second indices respectively of the element within the two-dimensional array, XPitch is a measure of the amount of data between each element in a first dimension of the 2-D array, YPitch is a measure of the amount of data between each element in a second dimension of the 2-D array, and SIZE_OF_PREV_BLKS is a cumulative size of previously populated blocks within the destination memory space.

4. The method of claim 3, wherein determining if the first block of memory includes sufficient space to store the element further comprises:
    determining if the destination address exceeds the sum of the address at which the first block of memory is located within the destination memory space and the size of the first block of memory.

5. The method of claim 4, wherein storing the element in the first block of memory responsive to a determination that the first block of memory includes sufficient space to store the element comprises:
    storing the element at the destination address.

6. The method of claim 5, wherein storing the element in a second block of memory responsive to a determination that the first block of memory does not include sufficient space to store the element comprises:
    setting CUR_BLOCK_ADDR to the address at which the second block of memory is located within the destination memory space;
    incrementing SIZE_OF_PREV_BLKS by the size of the first block of memory;
    recalculating the destination address in accordance with DEST_ADDR=CUR_BLOCK_ADDR+(X*XPitch)+(Y*YPitch)−SIZE_OF_PREV_BLKS; and
    storing the element at the destination address.

7. The method of claim 1, further comprising:
    receiving a table that identifies blocks of available memory within the destination memory space.

8. The method of claim 7, wherein receiving a table that identifies blocks of available memory within the destination memory space includes receiving a table that includes an address at which each block of available memory is located within the destination memory space and a block size for each block of available memory.

9. A system for transferring a multidimensional array of data, comprising:
- a source device;
- a source memory accessible by the source device, the source memory storing the multidimensional array of data; and
- a destination memory system coupled to the source device, the destination memory system comprising a destination memory space;
- wherein the source device is configured to access the source memory and read an element indexed in the multidimensional array, to determine if a first block of memory within the destination memory space includes sufficient space to store the element such that the element can be stored in a first location in the first block determined based on indices at which the element is indexed within the multidimensional array, to transfer the element to the destination memory system for storage in the first location responsive to a determination that the first block of memory includes sufficient space to store the element, and to transfer the element to the destination memory system for storage in a second location in a second block of the destination memory responsive to a determination that the first block of memory does not include sufficient space to store the element, wherein the first and second blocks are non-contiguous memory blocks, and wherein the second location is determined based on a size of the first block, a destination address in the second block, and a block size of the second block.

10. The system of claim 9, wherein the source device is configured to determine if the first block of memory includes sufficient space to store the element by calculating a destination address for storing the element and determining if the destination address is outside of the address space encompassed by the first block of memory, wherein determining if the first block of memory includes sufficient space to store the element comprises calculating a destination address for storing the element and determining if the destination address is outside of the address space encompassed by the first block of memory.

11. The system of claim 9, wherein the multidimensional array of data is a two-dimensional (2-D) array, and wherein the source device is configured to determine if the first block of memory includes sufficient space to store the element by calculating:

$$DEST\_ADDR = CUR\_BLOCK\_ADDR + (X*XPitch) + (Y*YPitch) - SIZE\_OF\_PREV\_BLKS,$$

wherein DEST ADDR is a destination address for storing the element, CUR_BLOCK_ADDR is the address at which the first block of memory is located within the destination memory space, X and Y are first and second indices respectively of the element within the two-dimensional array, XPitch is a measure of the amount of data between each element in a first dimension of the 2-D array, YPitch is a measure of the amount of data between each element in a second dimension of the 2-D array, and SIZE_OF_PREV_BLKS is a cumulative size of previously populated blocks within the destination memory space.

12. The system of claim 11, wherein the source device is further configured to determine if the first block of memory includes sufficient space to store the element by determining if the destination address exceeds the sum of the address at which the first block of memory is located within the destination memory space and the size of the first block of memory.

13. The system of claim 12, wherein the source device is configured to transfer the element to the destination memory system for storage in the first block of memory responsive to a determination that the first block of memory includes sufficient space to store the element by storing the element at the destination address.

14. The system of claim 13, wherein the source device is configured to transfer the element to the destination memory system for storage in a second block of memory responsive to a determination that the first block of memory does not include sufficient space to store the element by setting CUR_BLOCK_ADDR to the address at which the second block of memory is located within the destination memory space, incrementing SIZE_OF_PREV_BLKS by the size of the first block of memory, recalculating the destination address in accordance with $DEST\_ADDR = CUR\_BLOCK\_ADDR + (X*XPitch) + (Y*YPitch) - SIZE\_OF\_PREV\_BLKS$; and
storing the element at the destination address.

15. The system of claim 9, wherein the source device is further configured to receive a table that identifies blocks of available memory within the destination memory space.

16. The system of claim 15, wherein the table includes an address at which each block of available memory is located within the destination memory space and a block size for each block of available memory.

17. A method for transferring a multidimensional array of data to a destination memory space comprising:
- reading an element indexed in the multidimensional array;
- determining if a first block of memory within the destination memory space includes sufficient space to store the element such that the element can be stored in a first location in the first block determined based on indices at which the element is indexed within the multidimensional array;
- storing the element in the first location responsive to a determination that the first block of memory includes sufficient space to store the element; and
- storing the element in a second location in a second block of the destination memory responsive to a determination that the first block of memory does not include sufficient space to store the element, wherein the first and second blocks are non-contiguous memory blocks, and wherein the second location is determined based on indices at which the element is indexed within the multidimensional array, wherein the multidimensional array of data is a two-dimensional (2-D) array, and wherein determining if the first block of memory includes sufficient space to store the element comprises calculating:

$$DEST\_ADDR = CUR\_BLOCK\_ADDR + (X*XPitch) + (Y*YPitch) - SIZE\_OF\_PREV\_BLKS,$$

wherein DEST_ADDR is a destination address for storing the element, CUR_BLOCK_ADDR is the address at which the first block of memory is located within the destination memory space, X and Y are first and second indices respectively of the element within the two-dimensional array, XPitch is a measure of the amount of data between each element in a first dimension of the 2-D array, YPitch is a measure of the amount of data between each element in a second dimension of the 2-D array, and SIZE_OF_PREV_BLKS is a cumulative size of previously populated blocks within the destination memory space.

18. The method of claim 17, wherein determining if the first block of memory includes sufficient space to store the element further comprises:
   determining if the destination address exceeds the sum of the address at which the first block of memory is located within the destination memory space and the size of the first block of memory.

19. The method of claim 18, wherein storing the element in the first block of memory responsive to a determination that the first block of memory includes sufficient space to store the element comprises:
   storing the element at the destination address.

20. The method of claim 19, wherein storing the element in a second block of memory responsive to a determination that the first block of memory does not include sufficient space to store the element comprises:
   setting CUR_BLOCK_ADDR to the address at which the second block of memory is located within the destination memory space;
   incrementing SIZE_OF_PREV_BLKS by the size of the first block of memory;
   recalculating the destination address in accordance with DEST_ADDR=CUR_BLOCK_ADDR+(X*XPitch)+(Y*YPitch)−SIZE_OF_PREV_BLKS; and
   storing the element at the destination address.

21. A system for transferring a multidimensional array of data, comprising:
   a source device;
   a source memory accessible by the source device, the source memory storing the multidimensional array of data; and
   a destination memory system coupled to the source device, the destination memory system comprising a destination memory space;
   wherein the source device is configured to access the source memory and read an element indexed in the multidimensional array, to determine if a first block of memory within the destination memory space includes sufficient space to store the element such that the element can be stored in a first location in the first block determined based on indices at which the element is indexed within the multidimensional array, to transfer the element to the destination memory system for storage in the first location responsive to a determination that the first block of memory includes sufficient space to store the element, and to transfer the element to the destination memory system for storage in a second location in a second block of the destination memory responsive to a determination that the first block of memory does not include sufficient space to store the element, wherein the first and second blocks are non-contiguous memory blocks, and wherein the second location is determined based on indices at which the element is indexed within the multidimensional array, wherein the multidimensional array of data is a two-dimensional (2-D) array, and wherein the source device is configured to determine if the first block of memory includes sufficient space to store the element by calculating:
   DEST_ADDR=CUR_BLOCK_ADDR+(X*XPitch)+(Y*YPitch)−SIZE_OF_PREV_BLKS,
   wherein DEST_ADDR is a destination address for storing the element, CUR BLOCK ADDR is the address at which the first block of memory is located within the destination memory space, X and Y are first and second indices respectively of the element within the two-dimensional array, XPitch is a measure of the amount of data between each element in a first dimension of the 2-D array, YPitch is a measure of the amount of data between each element in a second dimension of the 2-D array, and SIZE_OF_PREV_BLKS is a cumulative size of previously populated blocks within the destination memory space.

22. The system of claim 21, wherein the source device is further configured to determine if the first block of memory includes sufficient space to store the element by determining if the destination address exceeds the sum of the address at which the first block of memory is located within the destination memory space and the size of the first block of memory.

23. The system of claim 22, wherein the source device is configured to transfer the element to the destination memory system for storage in the first block of memory responsive to a determination that the first block of memory includes sufficient space to store the element by storing the element at the destination address.

24. The system of claim 23, wherein the source device is configured to transfer the element to the destination memory system for storage in a second block of memory responsive to a determination that the first block of memory does not include sufficient space to store the element by setting CUR_BLOCK_ADDR to the address at which the second block of memory is located within the destination memory space, incrementing SIZE_OF_PREV_BLKS by the size of the first block of memory, recalculating the destination address in accordance with
   DEST_ADDR=CUR_BLOCK_ADDR+(X*XPitch)+(Y*YPitch)−SIZE_OF_PREV_BLKS; and
   storing the element at the destination address.

* * * * *

UNITED STATES PATENT AND TRADEMARK OFFICE
CERTIFICATE OF CORRECTION

| | | |
|---|---|---|
| PATENT NO. | : 7,822,891 B2 | |
| APPLICATION NO. | : 11/451322 | |
| DATED | : October 26, 2010 | |
| INVENTOR(S) | : McDonnell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 285 days.

Signed and Sealed this
Tenth Day of May, 2011

David J. Kappos
*Director of the United States Patent and Trademark Office*